United States Patent [19]

Kneafsey et al.

[11] Patent Number: 5,550,201
[45] Date of Patent: Aug. 27, 1996

[54] AIR ACTIVATABLE POLYMERIZABLE COMPOSITIONS CONTAINING TETRAZOLES

[75] Inventors: Brendan J. Kneafsey, Lucan; John Guthrie, Naas, both of Ireland

[73] Assignee: Loctite (Ireland) Limited, Ireland

[21] Appl. No.: 574,524

[22] Filed: Dec. 19, 1995

[30] Foreign Application Priority Data

Dec. 22, 1994 [IE] Ireland ................... 941002

[51] Int. Cl.⁶ ........................... C08F 4/00
[52] U.S. Cl. ........................... 526/204
[58] Field of Search ........................... 526/204

[56] References Cited

U.S. PATENT DOCUMENTS

| | | | |
|---|---|---|---|
| 1,780,334 | 11/1930 | Burnett et al. | 260/130 |
| 2,478,066 | 7/1952 | van Peski | 260/683.15 |
| 2,601,293 | 7/1952 | Howard | 260/63 |
| 3,987,019 | 10/1976 | Gruber et al. | 526/328 |
| 3,988,507 | 10/1976 | Gruber et al. | 526/328 |
| 3,991,261 | 11/1976 | Gruber et al. | 526/328 |
| 4,287,255 | 9/1981 | Wong et al. | 428/343 |
| 4,395,301 | 7/1983 | Bauer et al. | 156/307 |
| 4,395,361 | 7/1983 | Eickhoff et al. | 252/431 |
| 4,401,793 | 8/1983 | Chiao et al. | 525/285 |
| 4,430,480 | 2/1984 | Melody et al. | 525/160 |
| 4,450,030 | 5/1984 | Melody et al. | 156/307.3 |
| 4,452,955 | 6/1984 | Boeder | 525/518 |
| 4,855,373 | 8/1989 | Wolf et al. | 526/218.1 |
| 4,950,701 | 8/1990 | Okamura et al. | 524/237 |
| 5,045,614 | 9/1991 | Buchholz et al. | 526/219.5 |
| 5,506,326 | 4/1996 | Kneafsey | 526/320 |

FOREIGN PATENT DOCUMENTS

| | | | |
|---|---|---|---|
| 0169702 | 1/1986 | European Pat. Off. | C08F 4/00 |
| 287796 | 3/1991 | Germany | G03C 1/68 |
| 51-040912 | 11/1976 | Japan . | |
| 1157436 | 7/1969 | United Kingdom | C08F 1/02 |
| 1300387 | 12/1972 | United Kingdom | C08F 1/04 |
| 2087906 | 6/1982 | United Kingdom | C09J 3/14 |

OTHER PUBLICATIONS

G. Cilento et al., "The Autoxidation of a 1,4-Dihydronicotinamide Catalyzed by 4-Amino-2,6-di-iodophenol," Chemical Communications, 1968, pp. 1420-1421.

*Primary Examiner*—Joseph L. Schofer
*Assistant Examiner*—Wu C. Cheng
*Attorney, Agent, or Firm*—Edward K. Welch, II; Eugene F. Miller

[57] ABSTRACT

A one-component air-activatable polymerisable adhesive composition comprising:

(a) a free-radically polymerisable monomer, and an activator system for effective polymerisation of the free-radically polymerisable monomer, said activator system comprising:

(b) an autoxidisable compound which is a dihydropyridine (other than a stabilised 1,4-dihydropyridine)

(c) a tetrazole having the formula III

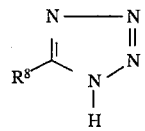

wherein $R^8$ is selected from hydrogen and hydrocarbyl groups, and (d) a soluble ionic salt, with the proviso that the composition does not contain a peroxide, or a peroxide precursor which produces peroxide in the absence of air or any ingredient which is a significant source of radicals in the absence of air, the composition having been prepared under anaerobic conditions and stored under anaerobic conditions.

9 Claims, No Drawings

AIR ACTIVATABLE POLYMERIZABLE COMPOSITIONS CONTAINING TETRAZOLES

BACKGROUND OF THE INVENTION

1. Field of the Invention

This invention relates to air-activatable polymerisable compositions and their use. The compositions are suitable for use as one-component systems for forming polymers, requiring no primers. The compositions are useful as adhesives, sealants, surface coatings, moulding resins and composite matrices, for example.

2. Description of Related Art

The cure of acrylic adhesives is initiated by a two-part redox system. The first part, the initiator, is normally present in the base component of the adhesive and the second part is present in the accelerator or curative component. However two-part systems suffer from the disadvantages and limitations of use associated with such systems. It is desirable to provide one-part systems.

Free radical polymerizable compositions are disclosed in European Patent Specification No. 0,356,875 of Henkel KGA. These comprise ethylenically unsaturated, polymerizable compounds together with an activator system which can be initiated by oxygen and water, comprising an N-alkyl-substituted tert-arylamine with at least one aliphatic CH bond in the alpha position, a metal compound generally used for accelerating the drying of unsaturated oil and which is at least partially soluble in the composition, and a compound of a weakly acidic carboxylic acid having a pKa value of no less than about 0.9, which can be hydrolyzed to a free carboxylic acid on contact with moisture.

The N-alkyl-substituted tert.-arylamines correspond in particular to the general formula:

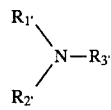

in which $R_1$, is an optionally substituted aryl radical, more especially an optionally alkyl-substituted phenyl radical, $R_2$, has the same meaning as $R_1$, or is an optionally substituted, linear or branched alkyl radical and $R_3$, is a linear or branched alkyl radical which may be substituted, but contains at least one hydrogen atom in the alpha-position to the nitrogen. These compositions depend on the action of both water and oxygen to effect a cure reaction. As such their formulations are very dependant on humidity conditions.

WO91/10687-A of Henkel KGaA discloses air-activatable adhesive compositions comprising mixtures of free-radically polymerisable unsaturated olefinic compounds, and hydrazone compounds prepared and stored under anaerobic conditions. The hydrazones may be alkyl, cycloalkyl and/or aryl hydrazone(s) of aldehyde(s) and/or ketone(s) and are claimed to react with air to form hydroperoxides useful as polymerisation initiators. The one component compositions are stable in the absence of air.

EP 0,502,733A of Loctite (Ireland) Limited (the contents of which are incorporated herein by reference) describes a one-part air-activatable polymerisable composition comprising:

(a) at least one free-radically polymerisable monomer, and (b) an activator system for effective polymerisation of the free-radically polymerisable monomer, said activator system comprising at least one auto-oxidisable compound of a formula which includes the structure I:

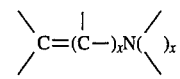

where x is 0 or 1, and where the lines representing unfilled valencies indicate bonds to carbon, hydrogen or hetero atoms, alone or in combination with a weak acid; with the proviso that:
when x=0, the nitrogen atom in structure I is not bonded to a second nitrogen atom;
and when x=1 there is a structure I in the compound in which the C=C moiety does not form part of a phenyl ring;

with the proviso that the composition does not contain a peroxide, or a peroxide precursor which produces peroxide in the absence of air or any ingredient which is a significant source of radicals in the absence of air.

Preferred auto-oxidisable compounds are selected from the group consisting of partially hydrogenated pyridines, condensation products of cyclic ketones and ureas, Schiff's bases, indoles, pyrroles, imidazoles, piperazines, carbazoles, tetrahydroquinolines, and substituted derivatives thereof, particularly dihydropyridines.

The most preferred auto-oxidisable compounds are 1,2-dihydropyridines.

The presence of a weak acid is generally preferred in order to achieve a satisfactory rate of auto-oxidation for the partially hydrogenated pyridines. The majority of the working examples using dihydropyridines in EP 92 301 899.8 have acrylic acid in the formulation. Other acids used are methacrylic acid, trichloroacetic acid, cyanoacetic acid, salicylic acid, benzoic acid, acetic acid and saccharin.

The composition may also contain a soluble ionic salt, particularly a cobalt or iron salt.

The compositions as described in EP 92 301 899.8 are stable against polymerisation during storage in the absence of air, they are activated by exposure to air, and they will then cure in either the presence or absence of air. However the use of volatile acids, particularly acrylic acid, may give rise to odour problems in a working environment.

EP 94301131.1 of Loctite (Ireland) Limited describes an air-activatable polymerisable composition comprising:

a) a free-radically polymerisable monomer, and;

b) an auto oxidisable compound which is a dihydropyridine;

c) An onium salt, and d) a soluble ionic salt.

While the compositions containing onium salts have value because they do not require the presence of a weak acid such as acrylic acid, there is a need for other solutions to improve the compositions of EP-A-O 502 733 by avoiding the use of volatile acids.

It is well known that alpha, beta- unsaturated carbonyl compounds undergo an addition reaction with conjugated dienes, known as the Diels-Alder reaction. 1,2-dihydropyridines behave as a conjugated diene in a Diels-Alder reaction with acrylic acid. Acrylic acid has a strong electron—withdrawing group close to the vinyl group. There is a risk therefore that compositions which contain a 1,2-dihydropyridine and acrylic acid may lose activity during storage due to consumption of the 1,2-dihydropyridine in forming the Diels-Alder adduct. Methacrylic acid is not believed to be as susceptible to the Diels-Alder reaction as acrylic acid. However methacrylic acid is not as effective as acrylic acid in activating the dihydropyridines. Further, both acrylic and methacrylic acid are volatile and may give rise to odour problems.

SUMMARY OF THE INVENTION

It is the object of the present invention to provide a one component substrate-insensitive polymerisable composition which is stable on storage in the absence of air, which is activated by exposure to air (without requiring photo-activation) and which then cures in either the presence or absence of air, but which does not require the presence of a weak acid for satisfactory auto-oxidation performance and which is not believed to be susceptible to the Diels-Alder reaction. According to the present invention there is provided an air-activatable polymerisable composition comprising:

(a) a free-radically polymerisable monomer, and an activator system for effective polymerisation of the free-radically polymerisable monomer, said activator system comprising:

(b) an auto-oxidisable compound which is a dihydropyridine having a general formula selected from II:

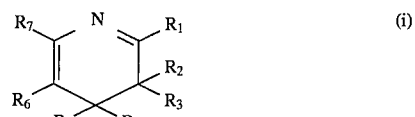
(i)

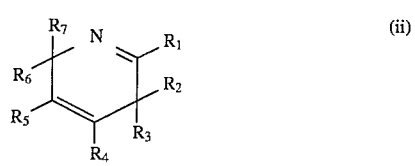
(ii)

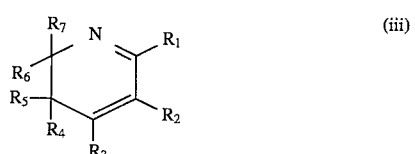
(iii)

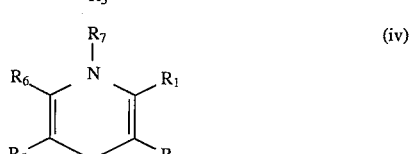
(iv)

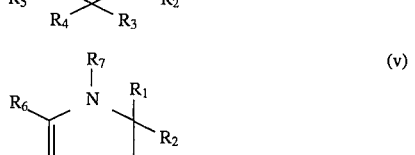
(v)

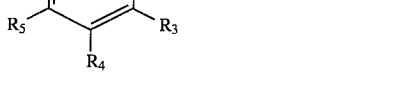

where $R_1$ to $R_7$, which may be the same or different, are independently selected from hydrogen, hydrocarbyl and heterohydrocarbyl groups, silyl groups, and substituted derivatives of any of the foregoing, and any two of the groups $R_1$ to $R_7$ may together form a mono- or polycyclic ring structure, which may optionally be a fused ring structure, and which in turn may be substituted, provided that none of the groups $R_1$ to $R_7$ is a group which is known to interfere with polymerisation, and that in the case of 1,4-dihydropyridines of formula II (iv) the groups $R_2$ and $R_5$ at the 3- and 5-positions are not both electron-withdrawing groups, (c) a tetrazole having the formula III

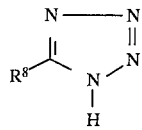

wherein $R^8$ is selected from hydrogen and hydrocarbyl groups, and (d) a soluble ionic salt, provided that the composition does not contain a peroxide, or a peroxide precursor which produces peroxide in the absence of air or any ingredient which is a significant source of radicals in the absence of air, the composition having been prepared under anaerobic conditions and stored under anaerobic conditions.

The tetrazoles of formula III are sufficiently acidic to be effective in activating the dihydropyridine auto-oxidisable compounds and therefore the compositions do not require the presence of a weak acid per se The preferred concentration ranges for the tetrazoles are as follows: from 0.5% to 20%, more preferably from 1% to 10%, and most preferably from 1% to 7% by weight of the composition.

The compositions of the invention may be used particularly for binding polyvinylchloride (PVC) surfaces, as the low polarity (due to the absence of an acid) enhances PVC bonding. On other surfaces where acrylic acid would normally be used as an adhesion promoter, alternative non-carboxylic acid adhesion promoters may be added, useful examples being phosphate esters of the type well known in the adhesive industry e.g. mono- or di-methacryloxyethylphosphate.

For the auto-oxidisable compound (b), 1,4-dihydropyridines of formula II (iv) and 1,2-dihydropyridines of formula II (v) are preferred, the 1,2-dihydropyridines being most preferred. $R_7$ in the compounds of formula II (iv) or II (v) is preferably other than hydrogen, and more preferably is an electron-donating group. In the case of 1,4-dihydropyridines of formula II (iv) the groups $R_2$ and $R_5$ at the 3- and 5-positions must not both be electron-withdrawing groups such as ester, acid, ketone, amide or nitrile groups because such substituents would render the 1,4-dihydropyridine stable to air oxidation. Other 1,4-dihydropyridines including the parent 1,4-dihydropyridine react rapidly in air (N. C. Cook and E. J. Lyons, J. Amer. Chem. Soc., 87, 3238 (1965)).

The term "hydrocarbyl" as used herein includes (i) straight chain or branched linear or alicyclic aliphatic groups including alkyl, alkenyl and alkynyl, preferably containing from 1 to 20, more preferably from 1 to 10, most preferably from 1 to 5 carbon atoms; and alkylene and alkenylene groups forming part of a ring structure which preferably contains from 3 to 30, more preferably 5 to 20 carbon atoms;

(ii) aromatic groups including aryl, alkaryl and aralkyl groups, preferably containing 6 to 20 carbon atoms, more preferably 6 to 10 carbon atoms, and optionally having a fused ring structure.

In the tetrazoles of formula III, $R^8$ is preferably: hydrogen; alkyl, most preferably having from 1 to 5 carbon atoms; aryl, most preferably phenyl or substituted phenyl or alkaryl, most preferably having from 1 to 5 carbon atoms in the alkyl moiety.

The term "heterohydrocarbyl" as used herein includes hydrocarbyl groups as described above interrupted by one or more hetero atoms selected from oxygen, nitrogen or sulphur.

The term "substituted" or "substituted derivative" as used herein includes the appropriate group substituted with one or more oxygen, nitrogen, sulphur or halogen atoms or atom-containing moieties e.g. hydroxy, amino, or trifluoromethyl, or with one or more silyl groups, which in turn may be substituted with one or more oxygen, nitrogen, sulphur or halogen atoms or atom-containing moieties. Preferably $R_1$ to $R_7$ and/or the substituents on the ring formed by any two of the $R_1$ to $R_7$ groups are hydrogen or methyl, ethyl, propyl, butyl, phenyl, benzyl, amide or trimethyl silyl groups. Halogen may be chlorine, bromine, fluorine or iodine.

Preferred soluble ionic salts (d) are metal salts of the type generally used in oil drying technology. The metals should have several valency states and suitable metal salts are those of multivalent metals, especially transition metals. The metal ions are preferably present in their low valency state. The metal salt must be at least partially soluble in the composition, and may be present in the composition in an effective amount which is generally in a range of between about 1 and about 1,000 parts per million, preferably about 30 to 200 ppm.

The choice of metal may have a velocity determining effect on initiation of polymerisation because of a temperature dependence of the metal component in the process. Iron, cobalt, manganese and vanadium are highly active at room temperature. In addition, compounds of these metals can be mixed with one or more other metallic components such as lead, cerium, copper, calcium, barium, zinc and/or zirconium.

Metal naphthenates or metal acetyl acetonates are generally soluble in the composition, but other salts or organometallics may be used if they are sufficiently soluble.

Suitable metal salts include iron (III) benzoylacetonate, iron (II) benzoylacetonate, cobalt (II) benzoylacetonate, cobalt (III) benzoylacetonate, copper (II) benzoylacetonate, iron (III) naphtenate, iron (II) naphthenate, cobalt (II) naphthenate, copper (II) naphtenate, iron (III) methacrylate, iron (II) methacrylate, cobalt (II) methacrylate, copper (II) methacrylate, iron (III) acrylate, iron (II) acrylate, iron (III) acetylacetonate, cobalt (III) acetylacetonate, cobalt (II) acetylacetonate copper (II) acetylacetonate and iron (III) trifluoroacetylacetonate.

The free-radically polymerisable monomer (a) may be selected from olefinically unsaturated systems such as acrylates, methacrylates, styrene, maleate esters, fumarate esters, unsaturated polyester resins, alkyd resins, thiol-ene compositions, and acrylate, methacrylate, or vinyl terminated resins including silicones and urethanes, provided that the tetrazole has adequate solubility therein. Suitable acrylates and methacrylates are those used in polymerisable systems such as disclosed in U.S. Pat. No. 4,963,220 of Bachmann et. al., and U.S. Pat. No. 4,215,209 of Ray-Chaudhuri et al. Particularly preferred are hydroxyl-containing methacrylates especially hydroxylalkyl methacrylates such as hydroxypropyl methacrylate. Also preferred are methylmethacrylate, polyfunctional methylacrylates, silicone diacrylates and polyfunctional acrylated urethaneS of the type known to be useful in formulating adhesives (e.g. as disclosed in U.S. Pat. No. 4,092,376 of Douek et al) or a thiol-ene (e.g. as disclosed in U.S. Pat. Nos. 3,661,744, 3,898,349, 4,008,341 or 4,808,638).

The autoxidisable compound (b) may be any dihydropyridine capable of reacting with atmospheric oxygen within the formulation, preferably by a free radical mechanism, for example as described herein or in EP 0, 502,733A.

The following are examples of compounds which are suitable for use in the composition of the invention as autoxidisable compounds.

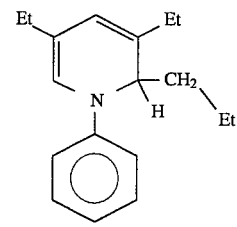

N-phenyl-2-propyl-3,5-diethyl-1,2-dihydropyridine

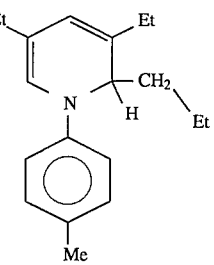

N-(4-methylphenyl)-2-propyl-3,5-diethyl-1,2-dihydropyridine

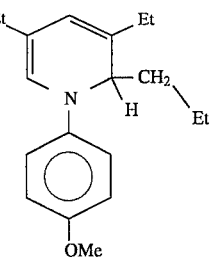

N-(4-methoxyphenyl)-2-propyl-3,5-diethyl-1,2-dihydropyridine

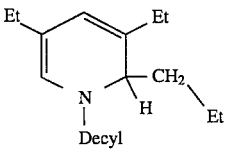

N-decyl-2-propyl-3,5-diethyl-1,2-dihydropyridine

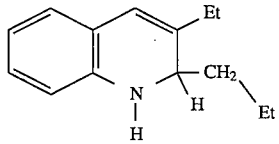

2-propyl-3-ethyl-1,2-dihydroquinoline

The auto-oxidisable compound will generally be present in an effective amount for effecting polymerisation of the composition upon exposure to atmospheric oxygen. Such effective amount is generally within the range of from about 0.1 to about 20%, preferably from about 0.1 to about 10%, more preferably from about 0.5 to about 5%, based on the weight of the polymerisable composition.

The composition may optionally further comprise reducing agents, thickeners, fillers, pigments and free radical polymerisation stabilisers.

For commercial compositions, the presence of fillers and/or thickeners is preferred. Filled and/or thickened compositions usually will not be photo-polymerisable.

Suitable reducing agents may be, but are not limited to, acetylphenylhydrazine, tetramethylthiourea or thiocaprolactam.

Polymeric thickeners may be present in the compositions in a minor amount, up to about 50%, and may be thickeners such as a polymer or prepolymer of low or high molecular weight. Suitable polymeric thickeners are a commercially available methacrylate polymer sold by E.I. du Pont de Nemours and Company, under the trademark Elvacite or by Rhom and Haas under the Trade Mark Ryloid, as well as styrene-methyl methacrylate co-polymers and polybisphenol A maleate (sold by ICI Americas Inc. under the trademark Atlac). It is also possible to add inert filling materials such as finely divided silica, fumed silica (treated or untreated), montmorillonite, clay, bentonite and the like. The use of micronized silica would result in a paste-like thixotropic composition.

Additionally, it is conventional to include in adhesive formulations certain "inert" fillers such as wood flour, glass fibres, cotton linters, mica, alumina, silica and the like to modify viscosity, improve impact resistance and for other purposes. Such fillers could be incorporated in the formulations of the present invention. Small percentages of silane monomers could also be added to increase moisture resistance, as well as to enhance bonding of an adhesive to glass and similar surfaces. Other substances such as dyes, fire retarders, stabilizers such as quinones and hydroquinones, thixotropes, plasticizers, antioxidants, and the like may also be included, although such additives may often be furnished in the principal ingredients, making their separate introduction unnecessary.

Peroxides, or peroxide percursors which produce peroxide in the absence of air, or any ingredient which is a significant source of radicals in the composition in the absence of air, should not be included in the compositions, so that polymerisation of the free-radically polymerisable monomer does not commence until it is exposed to oxygen.

The compositions of the present invention may suitably comprise 0.1 to 20% by weight of the auto-oxidisable compound, 0.1% to 20% by weight of the tetrazole and at least 10% by weight of the free-radically polymerisable monomer, the remainder being the ionic salt, thickeners, fillers, pigments, reducing agents and/or stabilisers, the total constituents adding up to 100%. In the case of compositions containing fillers or thickeners the content of fillers or thickeners is preferably not more than 60% by weight of composition.

The invention also provides a method of bonding two substrates comprising coating at least one substrate to be bonded with a composition as defined above, exposing the composition to oxygen for sufficient time to activate polymerization, and bringing the two substrates together. Typically at least about 5 seconds, but preferably at least about 30 seconds exposure to air would be suitable.

Furthermore the invention provides a method of forming a polymer, for example in topical coatings, encapsulation, moulding and the like, comprising exposing to oxygen for sufficient time to activate polymerization a composition as defined above. Typically at least about 5 seconds, but preferably at least about 30 seconds exposure to air would be suitable.

The above-described compositions are stable when prepared in the absence of air. Exposure to air results in the polymerisation of the composition, the polymerisation being sustained in the presence or absence of air once the initial exposure to air has taken place. Typically the exposure to air should be for at least about 5 seconds, preferably not less than 30 seconds, more preferably 1 to 5 minutes.

The compositions do not require exposure to light in the 310–420 nm range.

The compositions of the invention are true one-component polymerizable compositions comprising in essence a homogeneous mixture (in which no ingredient is separated e.g. by microencapsulation) and are thus much simpler to use than two-component compositions, and yet they have good stability when formulated under oxygen-free conditions and stored in a sealed container under inert gas. Their mechanism of polymerization is independent of the substrate and does not require photo-initiation and they thus have a wide range of applications. In addition it is possible to achieve a uniform distribution of cure in a thick bond line. Additionally, the compositions have rapid fixture times and good bond strengths. Furthermore they do not utilise weak acids of a volatile nature.

DESCRIPTION OF THE PREFERRED EMBODIMENTS

The invention is illustrated in the following examples. In examples 1–5, the term tetrazole refers to the compound of formula III in which $R^8$ is hydrogen.

EXAMPLE 1

Adhesive formulations were prepared by formulating in the proportions outlined in Table 1a. below hydroxypropyl methacrylate (HPMA) and 0.1% iron solution (in the form of ferric acetylacetonate dissolved in HPMA) and tetrazole. This formulation was added to an aluminium tube and exposed to a steady stream of inert gas such as nitrogen through a syringe needle for at least two minutes. N-phenyl 2-propyl 3,5 diethyl 1,2 dihydropyridine (DHP) was added to the formulation under the inert atmosphere. The aluminium tube was then sealed by crimping, thus trapping inert gas in the head space above the formulation. The aluminium tube was shaken for 10–20 seconds to ensure thorough mixing of the formulation components. The composition of the formulation is as follows:

TABLE 1a

| | |
|---|---|
| Hydroxypropyl methacrylate | 8.2 g |
| 0.1% ferric (acetylacetonate)$_3$ in hydroxypropyl methacrylate | 1.0 g |
| N-phenyl-2-propyl-3,5 diethyl 1,2 dihydropyridine | 0.5 g |
| Tetrazole | 0.3 g |

The adhesive was tested as follows:—samples of the adhesive were squeezed from the aluminium tube and spread onto mild steel test-pieces (4×1 inches) to form a film of approximately 0.1 mm in depth and exposed to air for a measured interval (hereafter referred to as the open time). Following the open time the mild steel test-pieces were brought together to form an adhesive joint with 0.5 inch (1.25 cm) overlap. The bonds strengths for bonds assembled using the above procedure and allowed to cure for 24 hours were tested according to ASTM- D1002 and are presented in the table 1b below.

TABLE 1b

| Open times /minutes | Fixture time /minutes | Bond strengths /MPa |
| --- | --- | --- |
| 2 | 3.25 | 7.7 |
| 4 | 4 | 6.5 |

EXAMPLE 2

An adhesive formulation was prepared under anaerobic conditions as described in Example 1. The formulation comprised the following components.

| | |
| --- | --- |
| Hydroxypropyl methacrylate | 9.1 g |
| 0.1% ferric (acetylacetonate)$_3$ in hydroxypropyl methacrylate | 0.1 g |
| N-phenyl-2 propyl-3,5 diethyl 1,2 dihydropyridine | 0.5 g |
| Tetrazole | 0.3 g |

The above adhesive formulation was tested as described in Example 1 and the results are presented in the following table.

| Open times /minutes | Fixture time /minutes | Bond strengths /MPa |
| --- | --- | --- |
| 2 | 3.5 | 7.1 |
| 4 | 3.0 | 4.8 |

EXAMPLE 3

An adhesive formulation was prepared under anaerobic conditions as described in Example 1. The formulation comprised the following components.

| | |
| --- | --- |
| Hydroxypropyl methacrylate | 8.7 g |
| 0.1% ferric (acetylacetonate)$_3$ in hydroxypropyl methacrylate | 0.5 g |
| N-phenyl-2 propyl-3,5 diethyl 1,2 dihydropyridine | 0.5 g |
| Tetrazole | 0.3 g |

The above adhesive formulation was tested as described in Example 1 and the results are presented in the following table.

| Open times /minutes | Fixture time /minutes | Bond strengths /MPa |
| --- | --- | --- |
| 2 | 3.25 | 6.7 |
| 4 | 3.0 | 5.6 |
| 10 | 3.0 | 4.7 |

EXAMPLE 4

An adhesive formulation was prepared under anaerobic conditions as described in Example 1. The formulation comprised the following components.

| | |
| --- | --- |
| Hydroxypropyl methacrylate | 8.9 g |
| 0.1% ferric (acetylacetonate)$_3$ in hydroxypropyl methacrylate | 0.5 g |
| N-phenyl-2 propyl-3,5 diethyl 1,2 dihydropyridine | 0.5 g |
| Tetrazole | 0.1 g |

The above adhesive formulation was tested as described in Example 1 and the results are presented in the following table.

| Open times /minutes | Fixture time /minutes | Bond strengths /MPa |
| --- | --- | --- |
| 2 | 5 | 5.6 |
| 4 | 4 | 4.8 |
| 10 | 3.75 | 4.8 |

EXAMPLE 5

An adhesive formulation was prepared under anaerobic conditions as described in Example 1. The formulation comprised the following components.

| | |
| --- | --- |
| Hydroxypropyl methacrylate | 8.5 g |
| 0.1% ferric (acetylacetonate)$_3$ in hydroxypropyl methacrylate | 0.5 g |
| N-phenyl-2 propyl-3,5 diethyl 1,2 dihydropyridine | 0.5 g |
| Tetrazole | 0.5 g |

The above adhesive formulation was tested as described in Example 1 and the results are presented in the following table.

| Open times /minutes | Fixture time /minutes | Bond strengths /MPa |
| --- | --- | --- |
| 1 | 4.5 | 6.9 |
| 4 | 4.0 | 10.6 |
| 4 | 4.0 | 5.9 |
| 10 | 4.75 | 4.6 |

EXAMPLE 6

An adhesive formulation was prepared under anaerobic conditions as described in Example 1. The formulation comprised the following components.

| | |
| --- | --- |
| Hydroxypropyl methacrylate | 8.5 g |
| 0.1% ferric (acetylacetonate)$_3$ in hydroxypropyl methacrylate | 0.5 g |
| N-phenyl-2 propyl-3,5 diethyl 1,2 dihydropyridine | 0.5 g |
| 5-phenyl-tetrazole | 0.5 g |

The above adhesive formulation was tested as described in Example 1 and the results are presented in the following table.

| Open times /minutes | Fixture time /minutes | Bond strengths /MPa |
| --- | --- | --- |
| 2 | 3.5 | 5.8 |
| 4 | 2.5 | 4.6 |

We claim:

1. A one-component air-activatable polymerisable composition comprising:

(a) a free-radically polymerisable monomer, and
an activator system for effective polymerisation of the free-radically polymerisable monomer, said activator system comprising:

(b) an autoxidisable compound which is a dihydropyridine having a general formula selected from II:

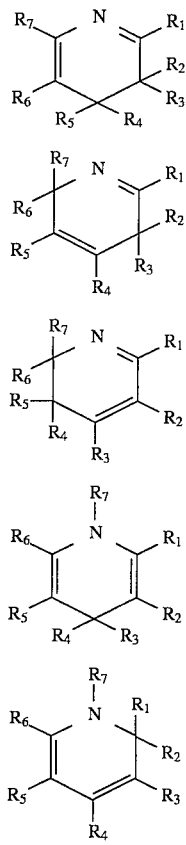

where $R_1$ to $R_7$, which may be the same or different, are independently selected from hydrogen, hydrocarbyl and heterohydrocarbyl groups, silyl groups, and substituted derivatives of any of the foregoing, and any two of the groups $R_1$ to $R_7$ may together form a mono- or polycyclic ring structure, which may optionally be a fused ring structure, and which in turn may be substituted, provided that none of the groups $R_1$ to $R_7$ is a group which is known to interfere with polymerisation, and that in the case of 1,4-dihydropyridines of formula II (iv) the groups $R_2$ and $R_5$ at the 3- and 5-positions are not both electron-withdrawing groups, (c) a tetrazole having the formula III

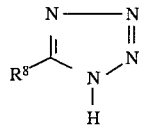

wherein $R^8$ is selected from hydrogen and hydrocarbyl groups, and (d) a soluble ionic salt, provided that the composition does not contain a peroxide, or a peroxide precursor which produces peroxide in the absence of air or any ingredient which is a significant source of radicals in the absence of air, the composition having been prepared under anaerobic conditions and stored under anaerobic conditions.

2. A composition as claimed in claim 1, wherein in the tetrazole of formula III, $R^8$ is hydrogen.

3. A composition as claimed in claim 1 wherein in the tetrazole of formula III, $R^8$ is alkyl.

4. A composition as claimed in claim 3 wherein $R^8$ is $C_1$-$C_5$ alkyl.

5. A composition as claimed in claim 1 wherein in the tetrazole of formula III, $R^8$ is aryl.

6. A composition as claimed in claim 1 wherein $R^8$ phenyl.

7. A composition as claimed in claim 1 wherein the tetrazole is present in an amount of from 0.5% to 20% by weight of the composition.

8. A composition as claimed in claim 7 wherein the tetrazole is present in an amount of from 1.0% to 10% by weight of the composition.

9. A composition as claimed in claim 8 wherein the tetrazole is present in an amount of from 1% to 7% by weight of the composition.

* * * * *